United States Patent [19]

Vochelli

[11] 4,448,005
[45] May 15, 1984

[54] INTERIOR AUTOMOTIVE SUNSHADE WITH RING HINGES

[75] Inventor: Julian P. Vochelli, Huntington Beach, Calif.

[73] Assignee: Hollywood Accessories, Compton, Calif.

[21] Appl. No.: 424,383

[22] Filed: Sep. 27, 1982

[51] Int. Cl.³ .............................................. E06B 7/08
[52] U.S. Cl. ...................................................... 52/473
[58] Field of Search ................... 52/473, 203, 74, 75; 160/184; 49/371

[56] References Cited

U.S. PATENT DOCUMENTS

| | | | |
|---|---|---|---|
| 2,152,447 | 3/1939 | Wheeler | 49/371 |
| 2,552,982 | 5/1951 | Lambert | 52/473 |
| 2,819,499 | 1/1958 | Abramson et al. | 52/473 |
| 3,984,930 | 10/1976 | Booland | 52/64 |

Primary Examiner—John E. Murtagh
Assistant Examiner—Kathryn Ford
Attorney, Agent, or Firm—Fulwider, Patton, Rieber, Lee & Utecht

[57] ABSTRACT

A simple, reliable and inexpensively manufactured sunshade for attachment to the interior surfaces of an automotive window is devised by providing a pair of ribs which are adhesively attached to the interior surface of the window. Each rib has a plurality of ring-shaped louver fixtures attached to the rib and aligned such that the pluarlity of ring-shaped fixtures attached to one rib substantially lie in a plane parallel to the longitudinal axis of the rib. The pair of ribs are aligned so that each ring-shaped fixture has its axis of symmetry approximately aligned with a corresponding ring-shaped fixture on the opposing rib. Elongated, resilient louvers are disposed through the aligned ring-shaped fixtures by the user so that the louvers are held by a pair of ring-shaped fixtures in a substantially parallel plane, perpendicular to the elongated axis of the ribs. The width of the resilient louver is slightly greater than the maximum diameter of the ring-shaped fixture and the side edges of the louver engage a plurality of teeth or indentions defined in the inside radial surface of the ring-shaped fixture. The smaller diameter of the ring-shaped fixture imparts a curvature to the resilient louver. The resiliency of the louver in turn serves to retain it within the fixture in the orientation selected by the user.

8 Claims, 5 Drawing Figures

INTERIOR AUTOMOTIVE SUNSHADE WITH RING HINGES

BACKGROUND OF THE INVENTION

1. Field of the Invention

The present invention relates to the field of automotive accessories and in particular relates to interior sunshades used on windows within automobiles.

2. Description of the Prior Art

The growing trend in compact and mini-cars has resulted in a new generation of automobiles characterized by large rear windows of a hatch-back or fast-back design. Typically, the automobile manufacturer offers no solution to the problem of direct sunlight or heat exposure to the rear passenger seats or compartment area. After-market louvered sunshades are available, but such exterior sunshades must be custom mounted either by the dealer or skilled mechanic; require a separate model for each automobile; are often distracting or unsightly in appearance; and are expensive. In addition, with an exterior sunshade, cleaning of the window is inconvenient and is required more often than is cleaning of the inside surface of the window.

The prior art has long utilized interior automobile sunshades which to some extent avoid part of the shortcomings of exterior sunshades now in popular use. For example, M. A. Stanfield, "Blind for Automobile Windows", U.S. Pat. No. 2,349,470 shows as interior automobile sunshade having fixed, riveted louvers attached to a pair of vertical rails inserted between the glass and the adjacent rubber insulation. See also R. C. Kramer, "Blind for Motor Vehicles", U.S. Pat. No. 2,210,624. Other prior art adaptions have been devised a plurality of ganged louvers which move in unison under the operation of a linkage bar and which are otherwise frame of an automobile, C. A. Digby, "Adjustable Blind for Windows", U.S. Pat. No. 2,485,263. In some cases, the means for attaching the adjustable blinds to an automobile windshield is so inconvenient that the window itself is completely replaced by a movable sunshade such as shown by L. G. Brown, "Sunshade", U.S. Pat. No. 2,119,803 and M. Shiota, "Securing Means for Sunshade Screens for Automobiles or the Like", U.S. Pat. No. 3,142,506.

What is needed then is an automobile accessory sunshade which is universal such that it fits most cars which have a relatively flat rear window including hatchbacks, fast-backs, sports cars, family sedans and station wagons with one piece lift-up tail gates. In addition, such accessories should have adjustable louvers to assure that the louvers can be placed in horizontal position for maximum visibility and good appearance regardless of the inclination of the window. What is further needed is a design which can be easily sold in kit form, cut to fit, installed and adjusted by the ordinary consumer without the need for special tools or skills. The design should also be such that after installation, the louvers can be easily removed for cleaning of the rear window. In addition, there is a need for such an accessory sunshade that can be secured to the rear window glass of an automobile in a manner such that accidental release of the louvers is prevented. Finally, the design must also be simple and inexpensive enough to manufacture, using standard and readily available materials, so that the resulting accessory is readily affordable.

BRIEF SUMMARY OF THE INVENTION

The present invention is an improvement in the sunshade for attachment to the interior surface of an automotive window comprising a pair of ribs which include means for afixing each of the ribs to the interior surface of the window. A plurality of louver fixtures are connected to each rib and spaced at regular intervals along the longitudinal axis of each corresponding rib. Each fixture is generally ring-shaped and defines a circumscribed space within the ring shape. A plurality of louvers is provided with each louver disposed through a pair of the louver fixtures which are connected to a corresponding one of the pair of ribs. Thus, each louver is supported near or at each end by one louver fixture. The louver is disposed through the louver fixture through the circumscribed space. Finally, means for temporarilly attaching and orienting the louver with respect to the fixture and rib is included within the louver fixture. In particular, this means includes a plurality of teeth or indentations defined on the inside, radial surface of the ring-shaped louver fixture. The width of each louver is slightly greater than the maximum diameter of the ring-shaped fixture such that the natural resiliency of the louver, when disposed through the circumscribed space in the ring fixture, causes the louver to assume a curvature and to be retained within the louver fixture as determined by the engagement of the teeth defined in the radial surface with the side edges of the louver.

By reason of this combination of elements a simplified fixture is devised which allows arbitrary orientation of the plurality of louvers in the very same fixture which provides for attachment of the louver to the rib and therefore indirectly to the window.

These and other embodiments may be better understood when viewing the following figures in light of the Detailed Description of the Preferred Embodiments.

DETAILED DESCRIPTION OF THE PREFERRED EMBODIMENTS

Figure 1:
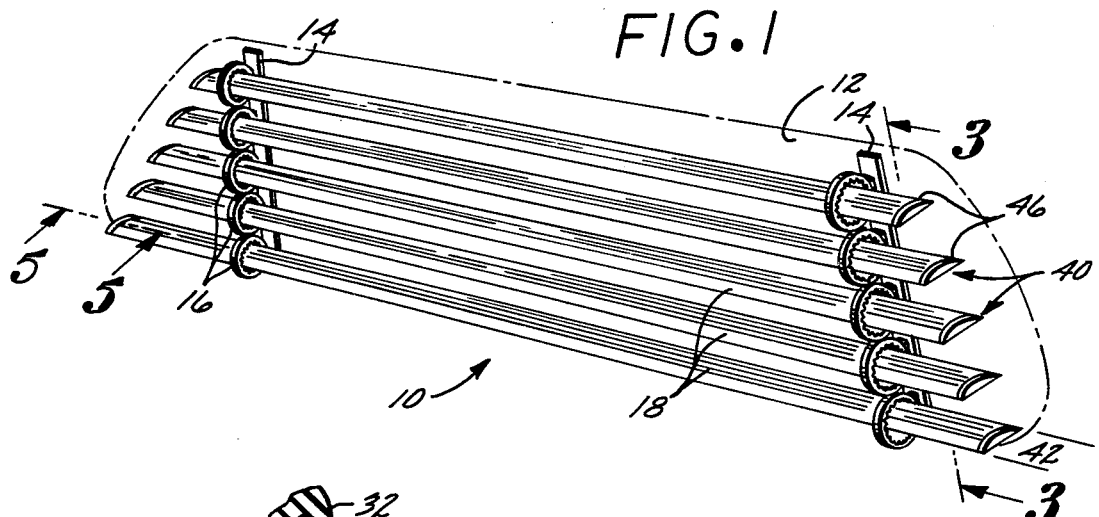
FIG. 1 is a perspective view of a sunshade according to the present invention shown as attached to and seen from the interior surface of the rear window of an automobile.

Referring to FIG. 1, the present invention is an improvement in a sunshade, generally denoted by reference numeral 10, attached to the inside surface of the rear window 12 of an automobile comprising at least two rails 14 directly attached to window 12, a plurality of ring hinges 16 described in greater detail in connection with FIGS. 2-4, and a corresponding plurality of louvers 18.

As depicted in FIG. 1, elongated ribs 14 are composed of soft pliable thermoplastic and are attached to window 12 by any conventional means, such as by an adhesive or adhesive tape. A plurality of ring hinges 16 are connected to ribs 14 by thermoplastic welding, gluing or other equivalent conventional means. Ring hinges 16 have a flat ring-shape and each of ring hinges 16 are connected to rib 14 approximately on the center, longitudinal axis of rib 14 and collectively aligned to lie in a single plane, substantially parallel to and coincident with the longitudinal axis of rib 14.

Figure 3:
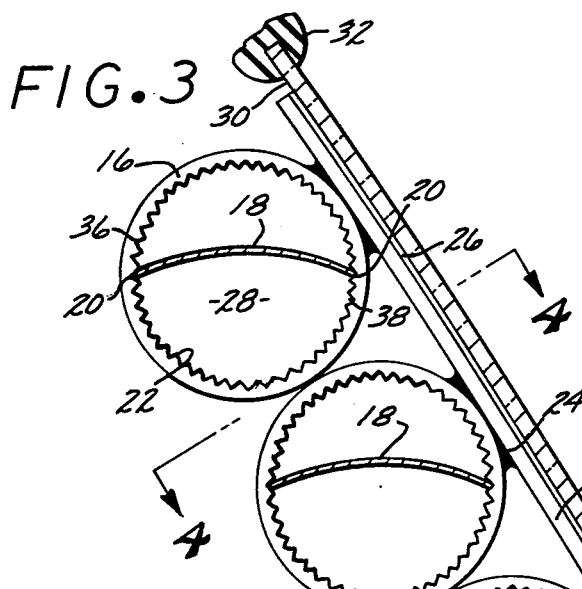
FIG. 3 is a side elevational view in enlarged scale taken through lines 3—3 of FIG. 1.

In addition, ring hinges 16, as better shown and described in connection with FIG. 3, are periodically connected to rib 14 in such a manner that hinges 16 nearly touch each other, thereby forming a virtually unbroken linear array of hinges along the length of the longitudinal axis of rib 14. Louvers 18 are disposed through ring hinges 16 such that the lateral edges 20 of each louver 18 engage the inside peripheral cylindrical, edges 20 engage a plurality of teeth 22 defined on the inside cylindrical surface of ring hinge 16. Thus, louvers 18 are individually and easily adjustable by the user to lie in an arbitrary angular orientation with respect to rib 14 and hence window 12, thereby providing minimal obstruction to the driver regardless of the particular angular orientation of window 12.

The embodiment of FIG. 1 has been shown as comprised of two ribs each including five ring hinges 16. It is also possible that rib 14 may be comprised of a series of segments which interlock to form the length in FIG. 1 or may include a basic length with optional extension kits available to provide one or more additional lenghts of rib 14 and corresponding ring hinges 16 in order to accommodate larger and smaller window sizes. Alternatively, rib 14 may be made with a maximum length which can be shortened by trimming the length of rib 14 by cutting off one or more unnecessary segments in corresponding ring hinges 16.

As a result, sunshade 10 serves as a universal attachment which will fit virtually all major automobile models presently marketed and may be simply assembled and adjusted by the user without the requirement of any tools or special skills.

Figure 2:
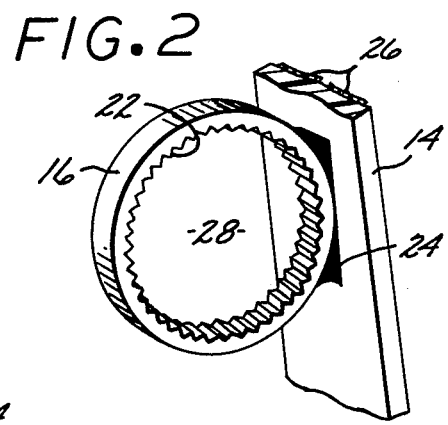
FIG. 2 is a perspective fragmentary view of a rail used in the sunshade showing a single ring hinge in enlarged scale.

The exact construction of ring hinge 16 is better illustrated in FIG. 2. Referring now to FIG. 2, a single ring hinge 16 is shown in fragmentary perspective view in enlarged scale thermoplastically welded to rib 14 as shown by welding 24. Rib 14 is illustrated in FIG. 2 as including on its reverse side, opposing the side to which ring hinge 16 is attached, two adhesive strips 26 which are used for attaching rib 14 to the interior surface or window 12 although any other equivalent attaching means could be used as well. Ring hinge 16 is generally circular in shape and circumscribes a space 28 through which louvers 18 are disposed as better shown and described in connection with FIG. 3. Ring hinge 16 thus includes an inside cylindrical surface in which teeth 22 are defined. Teeth 22 are defined by corresponding plurality of axial V-shaped notches cut or molded into the inside circumferential surface of ring hinge 16, with the axis of the notch running in a direction generally parallel with the axis of symmetry of ring-shaped hinge 16.

Referring now to FIG. 3, a side elevational view of sunshade 10 is shown in enlarged scale and better illustrates the manner by which sunshade 10 is attached to interior surface 30 of window 12 and the manner of disposition of louvers 18 inside ring hinges 16. As previously stated, rib 14 is attached to window 12 by a means of adhesive layer 26. Attachment of sunshade 10 is entirely to inside surface 30 of window 12 and in no way connects or intrudes into the conventional rubber sealing 32 in which 12 is mounted. Each ring hinge 16 is thermoplasticly welded to rib 14 as shown by weld 24 and placed in a plane aligned with the longitudinal axis of rib 14 in such a manner that each hinge 16 almost touches the adjacent hinge 16. Louvers 18, which are made of a flexible metal or plastic material, are then disposed within space 28 within each ring hinge 16. The width 34 of louver 18 is slightly larger than the maximum inside diameter of ring hinge 16. Therefore, when louver 18 is disposed within ring hinge 16, it is forced to bend to form a gentle arc, as illustrated in perspective in FIG. 1 and in side view in FIG. 3. The degree of bend is determined by the amount by which width 34 exceeds the maximum diameter of ring hinge 16 as measured from the deepest portion of one notch 36 to the deepest portion of a diametrically opposing notch 38.

Normally, the user will insert louvers 18 into ring hinges 16 so that each of the arcuate louvers 18 are disposed in a generally horizontal direction as shown in solid outline in FIG. 3 permitting the driver and unobstructed view through window 12. The second to the bottom ring hinge 16 in FIG. 3 illustrates in dotted outline that louver 18 may actually be disposed in any relative angular orientation according to user preference. However, once disposed in a orientation the degree of flexture of louver 18 across its width 34 is sufficient to retain louver 18 tightly wedged between teeth 22 of ring hinge 16 under all normal road vibrations or other normal forces which might otherwise tend to disturb the initially set orientation of louvers 18.

Figure 4:
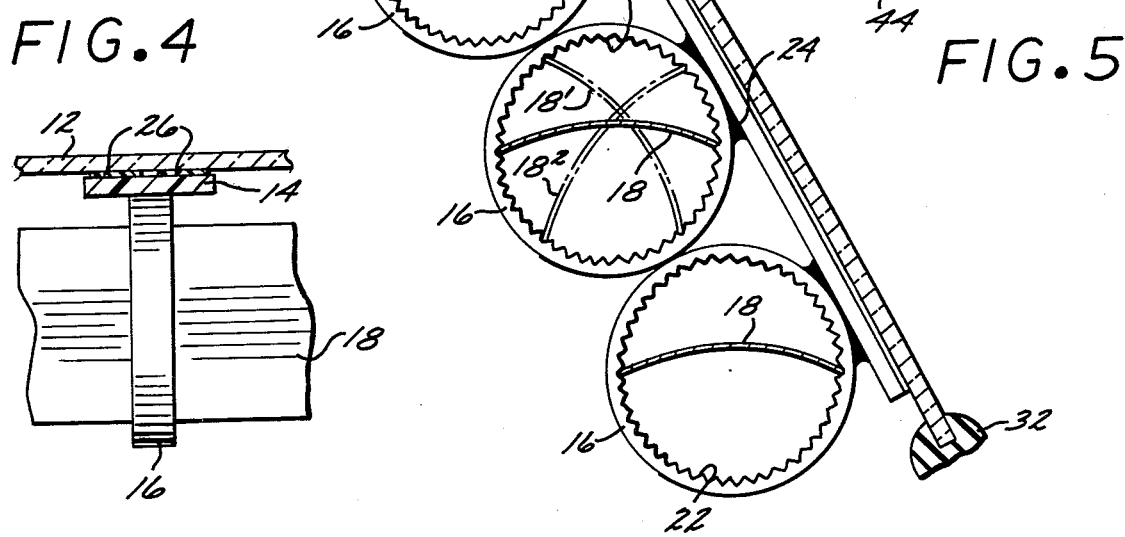
FIG. 4 is a fragmentary elevational view taken through lines 4—4 of FIG. 3.

FIG. 4 illustrates a fragmentary top elevational view taken through lines 4—4 of FIG. 3 showing the appearance of a louver 18 when disposed through a ring hinge 16. The curved upper service of louver 18 tends to assist in breaking up and scattering light which penetrates window 12. The curved arcuate shape of louver 18 is maintained at the ends of louver 18 by means of an end cap 40 best shown in FIG. 5.

Figure 5:
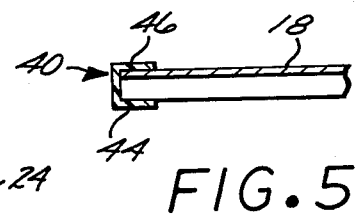
FIG. 5 is a sectional view in enlarged scale taken through lines 5—5 of FIG. 1.

Referring now to FIG. 5, end cap 40 is shown in a sectional view taken through lines 5—5 of FIG. 1 and provides the same curvature to louver 18 at its ends as does ring hinge 16 at its attachment to louver 18. For example, referring again to FIG. 1, end cap 40 has a width 42 defined by a lower substantially flat edge 44, shown in FIG. 5 opposing as acruous upper edge 46. Upper edge 46 forms a segment of a circle of which lower edge 44 is a cord, which circle has substantially the same curvature as that defined in louvers 18 when inserted in hinges 16. Thus, end caps 40 provide a uniformly pleasing esthetic curvature to louvers 18 along their entire longitudinal length, otherwise louvers 18 would have a tendency to flatten slightly at their extremities.

It must be understood that many modifications and alterations may be made by those having ordinary skill in the art without departing from the spirit and scope of the present invention. For example, although ring hinges 16 have been shown as thermoplasticly welded or otherwise fixidly adhered to rib 14, it is entirely within the scope of the present invention that each ring hinge 16 could be provided with an interlocking tab which would be inserted by the consumer into a corresponding mating slot defined in rib 14. Similarly, ring hinges 16 could be modified to provide for a ganged rotation of the plurality of louvers 18 using design principles well known to the art. The invention has been described herein with respect to a particularly illustrated embodiment which has been shown and described only for the purposes of example and is not to be taken as limiting the scope of the present invention as set forth in the following claims.

I claim:

1. An improvement in a sunshade for attachment to the interior surface of an automotive window comprising:
    a pair of ribs including means for affixing said ribs to the interior surface of said window;
    a plurality of louver fixtures connected to each rib and spaced at regular intervals along the longitudinal axis of said corresponding rib, each fixture being ring-shaped and defining a circumscribed space;
    a plurality of louvers, each louver disposed through a pair of said louver fixtures connected to a corresponding one of said pair of ribs, said louver disposed through said louver fixture through said circumscribed space; and
    means for temporarily attaching and orienting said louver to said fixture and rib, said means for attaching and orienting included within said louver fixture, whereby a simplified fixture may be devised which allows arbitrary orientation of said plurality of louvers in the same fixture which provides for attachment of said louvers to said rib and therefore indirectly to said window.

2. The improvement of claim 1 wherein each said louver fixture includes an inside radial surface, said inside radial surface providing a defining surface circumscribing said space through which said corresponding louver is disposed, and wherein said means for attaching and orienting includes at least two indentations defined in said inside surface of said louver fixture, said indentation generally being defined in opposing surface segments of said inside radial surface.

3. The improvement of claim 2 wherein each of said louvers is an elongated resilient slat having a longitudinal axis and a width perpendicular to said longitudinal axis, wherein said inside radial surface of each said louver fixture is a generally cylindrical surface and wherein said width of said louver is greater than the maximum inside diameter of said inside radial surface, said maximum inside diameter being measured from the maximum depth of one of said indentations to the maximum depth of a diametrically opposing one of said indentations.

4. The improvement of claim 1 or 3 wherein said plurality of louver fixtures are arranged and configured to substantially lie in a plane parallel to the longitudinal axis of said corresponding rib and wherein each louver fixture is substantially proximate to each adjacent louver fixture so that said plurality of louver fixtures on each said rib form a consecutive linear array of fixtures.

5. The improvement of claim 3 further comprising an end cap disposed on each end of each of said louvers, said end cap for providing a curvature to said louver of approximately the same degree as said louver fixture.

6. The improvement of claim 5 wherein said end cap is a cap having two sides, one substantially flat side forming a cord across said other side forming an arc with a curvature substantially equal to the curvature imparted to said louvers by said plurality of louver fixtures.

7. An improvement in a louver fixture in a sunshade for attachment to the interior surface of an automotive window including two ribs attached to said window and disposed across the surface of said window in a generally vertical direction, and plurality of elongated louvers coupled to said ribs by a corresponding plurality of louver fixtures, each louver being coupled to a corresponding rib at each end of said louver by one of said louver fixtures, said improvement comprising a generally ring-shaped louver fixture with and inside, generally cylindrically shaped surface having a plurality of teeth defined therein, said louvers disposed within the space circumscribed by said inside surface with the elongated longitudinal axis of each louver being generally parallel to the axis of said symmetry of said ring-shaped louver fixture, the opposing side edges of said louver engaging said teeth defined in said inside surface of said louver fixture, whereby said louver may be coupled to said louver fixture by engagement of opposing side edges of said louver with said teeth in an arbitrary orientation with respect to said rib so that each louver may be individually and easily oriented in a generally horizontal plane to provide minimal visual obstruction through said window.

8. The improvement of claim 7 wherein the inside diameter of said generally cylindrical inside surface of each louver fixture is less than the width of said louver in a direction perpendicular to said longitudinal axis of said louver, thereby imparting a curvature to said louver to enhance dispersion of light from said louver and to enhance secure engagement of said louver within each said louver fixture.

* * * * *

Disclaimer 4,448,005.—*Julian P. Vochelli*, Huntington Beach, Calif. INTERIOR AUTOMOTIVE SUNSHADE WITH RING HINGES. Patent dated May 15, 1984. Disclaimer filed Mar. 29, 1989, by the assignee, Mr. Gasket Co.

Hereby enters this disclaimer to the entire term of said patent.
[ *Official Gazette June* 6, 1989 ]